S. G. SINGLETON.
TRAY.
APPLICATION FILED DEC. 21, 1917.
1,267,810.
Patented May 28, 1918.
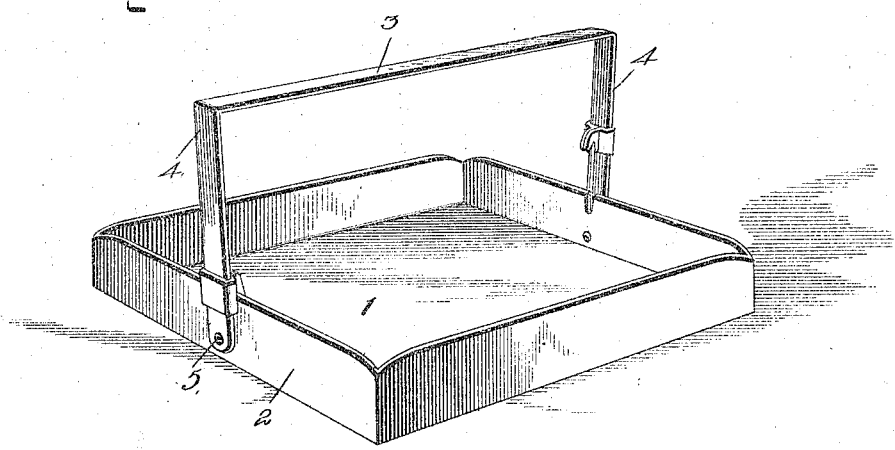
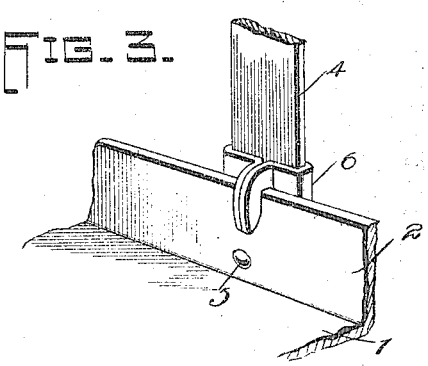
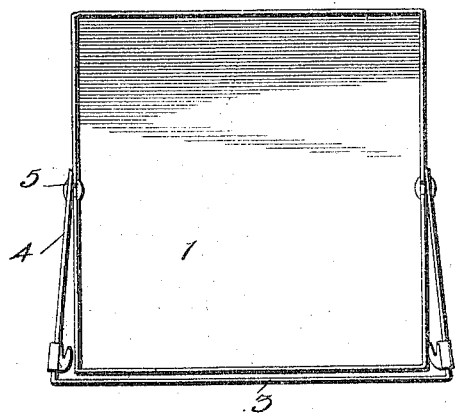
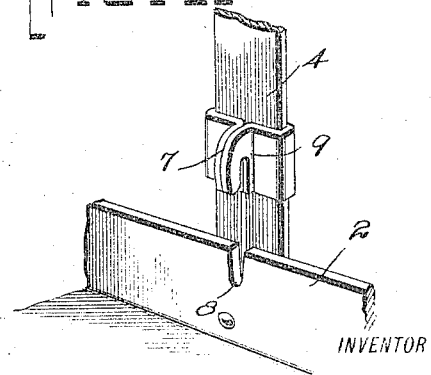
WITNESS
John H. Phillips Jr.
INVENTOR
STEPHEN G. SINGLETON,
BY
ATTORNEYS

UNITED STATES PATENT OFFICE.

STEPHEN GILBERT SINGLETON, OF BURKE, IDAHO.

TRAY.

1,267,810.  Specification of Letters Patent.  Patented May 28, 1918.

Application filed December 21, 1917. Serial No. 208,241.

*To all whom it may concern:*

Be it known that I, STEPHEN GILBERT SINGLETON, a citizen of the United States, and a resident of Burke, in the county of Shoshone and State of Idaho, have invented certain new and useful Improvements in Trays, of which the following is a specification.

My invention is an improvement in trays, and has for its object to provide a device of the character specified, especially adapted for bakers' use, wherein the tray has a handle which may be swung down into the plane of the tray or into a position perpendicular to the tray to facilitate the handling of the tray and to support a protecting screen for the tray, and which may be locked in the last named position.

In the drawings:

Figure 1 is a perspective view of the improved tray, showing one of the locking means released;

Fig. 2 is a top plan view with the handle folded;

Figs. 3 and 4 are perspective views of one of the locking means showing the said means in locking and released position.

The present embodiment of the invention comprises a tray body consisting of a bottom 1 and upstanding side walls 2, and the handle is a yoke shaped or U-shaped member comprising a body 3 and arms 4 extending at approximately a right angle to the ends of the body and pivotally connected to opposite side walls of the tray, as indicated at 5.

The body of the handle is of greater length than the distance between the pivotal connections 5 of the arms, so that the handle may fold down outside of the side walls of the tray, as shown in Fig. 2, with the locking means, to be described, also outside of the side walls and below the level of the top of the same.

Each of the locking means comprises a clip 6 which is mounted to slide upon the adjacent arm 4 of the handle, and each clip has inwardly extending lugs 7 which are adapted to engage a notch 8 in the side wall of the tray just above the pivotal connection.

It will be noticed that the clips are formed by bending a strip of metal about the arm of the handle, with the ends of the strip bent inwardly and abutting to form the lug 7. This lug is notched on its under side, as indicated at 9, to enter into locking engagement with the side at the bottom of the notch 8.

In use, when the trays are to be stored, they may be arranged one upon each other, with the handles turned down into the position of Fig. 2. When it is desired to use the handle, it is swung up into the position of Fig. 1, and the locking means are pushed downwardly until the lugs 7 engage the notches 8 in the manner shown in Fig. 3. The tray handle is now further locked in a position perpendicular to the plane of the bottom of the tray, and this handle may serve as a handle or as a support for a screen to prevent the access of flies and other insects to the contents of the tray.

To fold the handle it is only necessary to slip the clips upwardly, as indicated at the right of Fig. 1 and in Fig. 4, and when these clips are pushed up near the body 3 of the handle the handle may fold downwardly with the clips outside of the side walls of the tray, as shown in Fig. 2.

I claim:

A tray comprising a tray body rectangular in form and a yoke or U-shaped handle, consisting of a body extending transversely of the tray and arms pivoted to opposite sides of the tray, a clip mounted to slide on each arm and slidable the full length of the arm and having an inwardly extending lug, the side wall of the tray at the arm being notched to receive the lug to lock the handle perpendicular to the plane of the body of the tray and the body of the handle being of greater length than the distance between the pivotal connection of the handle with the tray for permitting the clips to fit outside of the tray when the handle is folded into the plane of the tray.

STEPHEN GILBERT SINGLETON.

Witnesses:
L. E. WORSTELL,
S. L. SHONTS.

Copies of this patent may be obtained for five cents each, by addressing the "Commissioner of Patents, Washington, D. C."